Nov. 15, 1960 — L. P. YOUNG — 2,960,673
RESISTANCE DEVICES
Filed Aug. 4, 1959

INVENTOR.
LEONARD P. YOUNG
BY
ATTORNEY

United States Patent Office 2,960,673
Patented Nov. 15, 1960

2,960,673

RESISTANCE DEVICES

Leonard P. Young, Chester, Conn. (Deep River, Conn.)

Filed Aug. 4, 1959, Ser. No. 831,550

1 Claim. (Cl. 338—221)

This invention generally relates to electric chokes or resistances, and especially to a resistance device for the control of temperatures of soldering appliances, and particularly of the type known as soldering guns.

As is well known in connection with the use of soldering guns, the temperature produced by passing electric current through a heatable resistance cannot be effectively controlled through timing of the passage of current through such resistance, and either over-heating or insufficient heating of such devices often occurs. In order to prevent damage to a soldering gun due to over-heating and furthermore, in order to fairly accurately control the heat applied to an article to be soldered, it is preferable not to rely on timing but to control the supply of current before it reaches the soldering gun. That is done in the present invention by passing the current supplied to the gun through a resistance.

Obviously it is old to place resistances in an electric circuit where such resistances would be required, however, the present invention contemplates the use of a specifically designed control device which will facilitate the supply of current to a soldering gun, or any similar soldering appliance, at defined intensities to be chosen by the operator of the appliance so that a desired temperature of the appliance can be fairly exactly maintained. To that end the present invention comprises a very simple arrangement of a resistance or choke arrangement, which is inexpensive in production, efficient in function, and which can be operated with satisfactory results by even unskilled workers.

The prime object of the present invention therefore is the provision of a temperature control device for electrical solder appliances, such as soldering guns and the like, which is simple in construction, inexpensive and so handy that it can be readily effectively operated by even unskilled labor.

A more specific object of the present invention is the provision of a temperature control device for soldering appliances consisting of a tapped resistance encased in a ventilated housing, and which device is provided at one of its ends with connecting prongs adapted for insertion in an existing electric outlet, while its other end is equipped with multiple prong receiving means for accommodating connecting prongs of an existing electric soldering appliance at at least one of two possible positions.

The foregoing and further important objects and advantages of the present invention will become more fully apparent from the ensuing description, in conjunction with the accompanying drawings, wherein.

Figure 1:
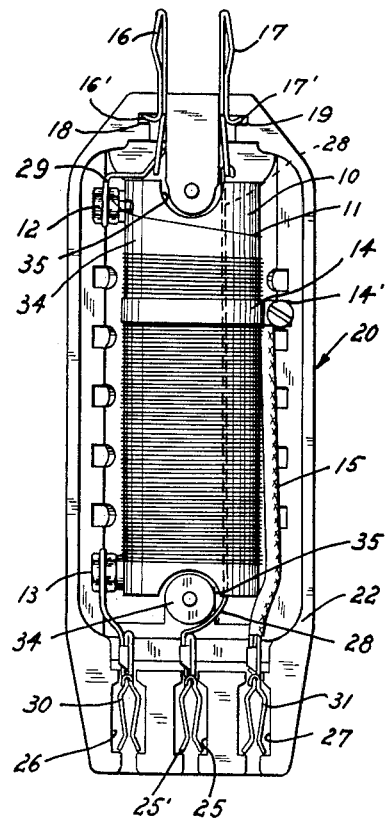
Fig. 1 is a plan view of the presently preferred form of the device with the upper half of its casing or housing removed.
Figure 2:
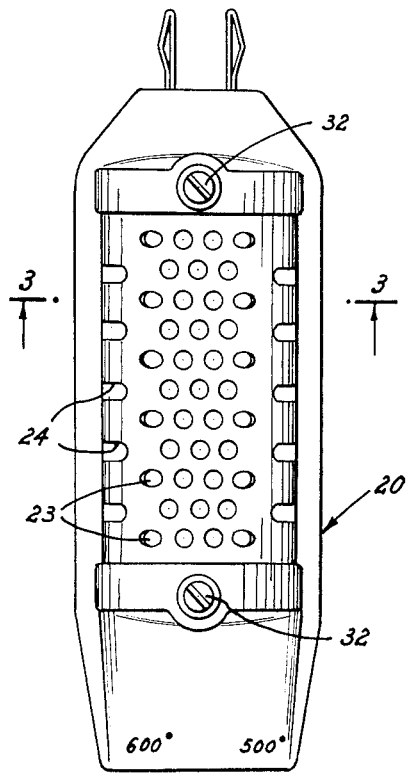
Fig. 2 is a similar plan view of the device with the casing in closed position.

In the drawings, numeral 10 denotes a dielectric support for a resistance wire indicated at 11, one end of which latter is preferably connected and held at the upper end of the support by an arrangement of a screw and nuts indicated at 12. Support 10 is preferably a cylindrical and hollow structure, about the outer surface of which is wound resistance wire 11, which extends from the upper support end to its lower end held at 13 in a similar arrangement as at 12. Engaging resistance wire 11 is a mobile tap in the form of clamping ring 14, the ends of which are held together at 14'. Secured to ring connection 14' is the upper end of an insulated conductor 15.

Figure 3:
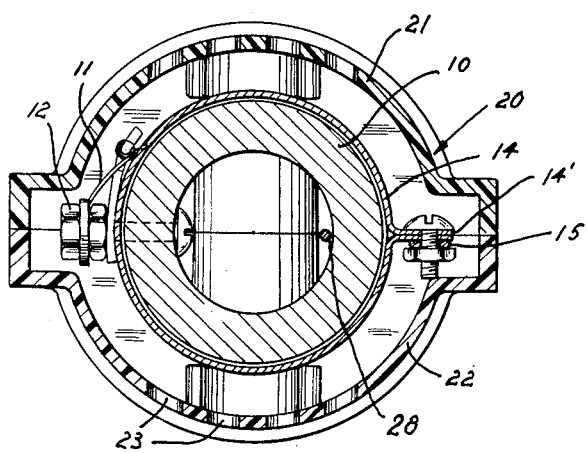
Fig. 3 is an enlarged sectional view taken approximately along lines 3—3 of Fig. 2.
Figure 4:
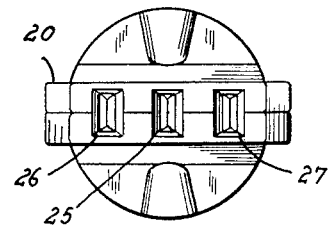
Fig. 4 is an end view of the device as seen from the bottom end of Fig. 2.

As will be seen in Fig. 1, from the upper end of the housing or casing there extend two connecting prongs 16 and 17 adapted for passage into an existing electric outlet. Portions 16' and 17' of these prongs are imbedded in suitable recesses 18 and 19 to securely hold the prongs in place. As will be noted from Fig. 3, casing 20 is composed of upper half 21 and lower half 22. The casing is hollow and is provided with numerous perforations 23 and 24 for providing air ingress and air circulation about dielectric support 10, thereby cooling resistance wire 11. At the lower end of casing 20 there will be seen three aligned recesses or sockets, that is a middle socket 25 and two outer sockets 26 and 27 for receiving at one time in the middle socket and one outer socket a pair of prongs connected with a soldering appliance.

As stated previously, support 10 is in the form of a hollow cylinder, and through its hollow body passes a conductor 28 extending from prong 17. Conductor 28 is connected with prong engaging clip 25' housed in middle socket 25. Prong 16 has an extension 29 with which the upper end of resistance wire 11 is connected at 12. The lower end of resistance wire 11 is secured at connection 13 to which is also secured prong receiving clip 30 located in left-hand outer socket 26. In right-hand outer socket 27 there is housed another prong receiving clip 31 which is connected by means of insulated lead 15 to mobile ring tap 14. Due to the mobility of ring tap 14, the latter can be moved to various positions to provide different resistance values, and at which positions tap ring 14 is adapted to provide conductive contact with resistance wire 11.

Both casing portions 21 and 22 are adapted to register with one another and are preferably held together by two screws 32 passing through suitable bosses 33 and 34 provided in the casing halves. In order to accommodate these bosses dielectric support 10 is provided with recesses 35 which are instrumental in keeping the dielectric support in fixed position.

*Operation*

From the foregoing it will be noted that the upper and lower ends of resistance wire 11 are connected, respectively, with prong 16 and clip 30 of the left-hand socket 26. It will be also noted that prong 17 is connected by lead 28 directly to clip 25' in middle socket 25 and that tap 14 is connected by conductor 15 to clip 31, in right-hand socket 27.

Prongs 16 and 17 are adapted to be inserted into an existing electric outlet. When an electric soldering appliance, such as a soldering gun, is to be kept at a certain temperature, say 500 degrees, its connecting prongs are inserted into sockets 25 and 27 to be engaged by clips 25' and 31, respectively. In this manner electric current from prongs 16 passes through a short portion of resistance wire 11 and is passed through tap 14 to clip 31. Prong 17 passes current directly from an electric outlet to clip 25' by way of conductor 28. By thus shunting a short portion of a resistance wire into the circuit leading to the soldering gun, the latter will be kept at a desired temperature, say of 500 degrees, which will remain substantially constant.

When the temperature of the soldering iron is to be raised to say 600 degrees, the prongs leading from the soldering appliance are inserted into middle socket 25 and left-hand socket 26 so that clips 25' and 30, respectively, are connected with the appliance. In this case the entire length of resistance wire 11 is placed in the supply circuit, whereby current to the soldering appliance is delivered to keep the latter at a steady temperature of 600 degrees. For the sake of convenience and for assuring correct use of the device with soldering guns, the multiple socket end of the casing is preferably marked to indicate temperatures, such as 500 degrees and 600 degrees. Due to the perforations 23 and 24 provided in the two casing halves, a steady air circulation is provided about support 10 and resistance wire 11 to prevent overheating of the structure.

While in the foregoing a specific construction of the present device is described in connection with the structure shown in the drawings, it is quite obvious that in the course of manufacture of the device various structural changes may have to be made to facilitate and reduce cost of production, such changes being deemed to reside within the scope of the present invention as defined in the annexed claim.

What is claimed as new is:

In an electric resistance structure, a dielectric hollow cylindrical support for a resistance wire, a resistance wire wound about it, means for connecting the ends of the wire arranged at the ends of said support, a mobile tap in the form of a split clamping ring engaging the resistance wire and having connecting means for holding together its ends and serving for attachment of a conductor, a hollow, perforated dielectric casing spaced from and enclosing said wire support, said casing being composed of two connected halves, a pair of prongs extending from one end of the casing, said prongs having sidewisely projecting portions, the casing having recesses for accommodating said projecting prong portions, three aligned prong-receiving sockets provided at the other casing end and comprising a middle socket and two outer sockets, said sockets having means for receiving at one time a pair of connecting prongs so that one of the prongs engages the middle socket, while the other prong engages one of the outer sockets; said pair of prongs extending from that one end of the casing being securely held in place by said projecting prong portions extending into said recesses in said casing, one of these prongs being connected to one end of the resistance wire, the other prong being connected to the middle socket at that other casing end, the other end of the resistance wire being connected to one of the outer sockets, and the mobile tap being connected to the other outer socket.

References Cited in the file of this patent

UNITED STATES PATENTS

| | | |
|---|---|---|
| 2,015,209 | Whiteside | Sept. 24, 1935 |
| 2,142,355 | Hastings | Jan. 3, 1939 |
| 2,622,409 | Stirnkorb | Dec. 23, 1952 |
| 2,646,489 | McArron | July 21, 1953 |